C. M. KEMP.
CARBURETER.
APPLICATION FILED JUNE 8, 1910.
989,980.
Patented Apr. 18, 1911.
2 SHEETS—SHEET 1.
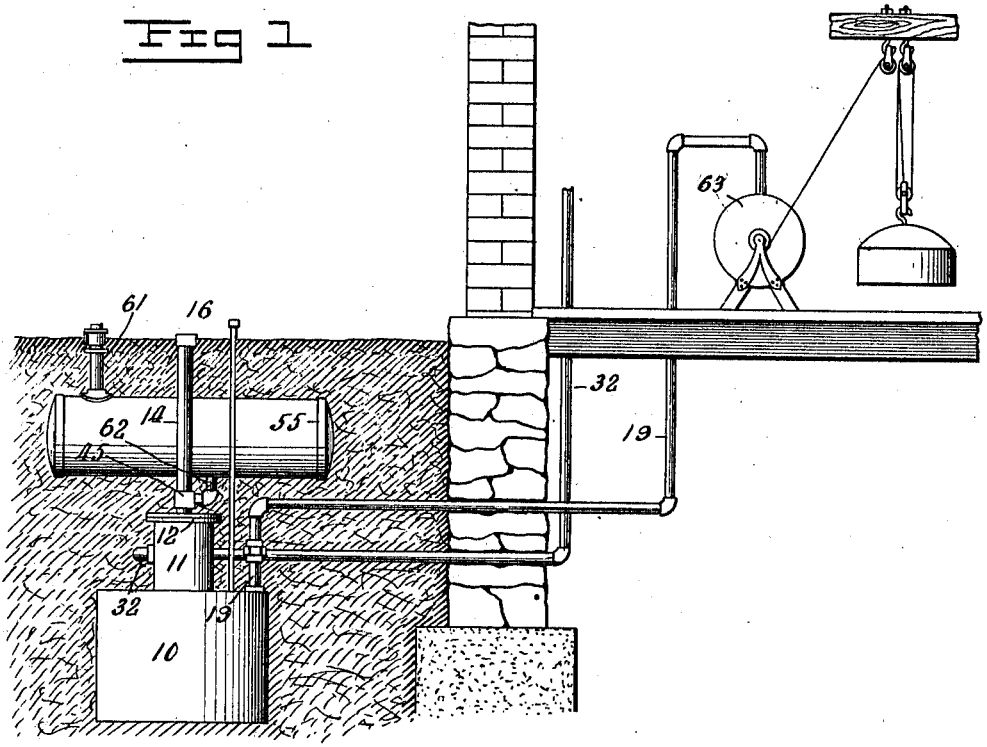
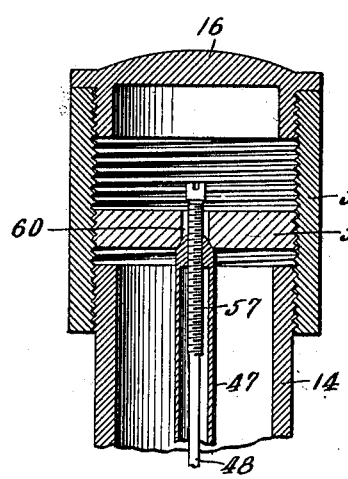
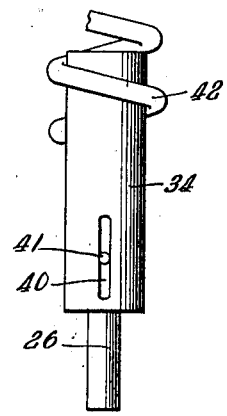
Inventor
Clarence M. Kemp.

C. M. KEMP.
CARBURETER.
APPLICATION FILED JUNE 8, 1910.
989,980.
Patented Apr. 18, 1911.
2 SHEETS—SHEET 2.
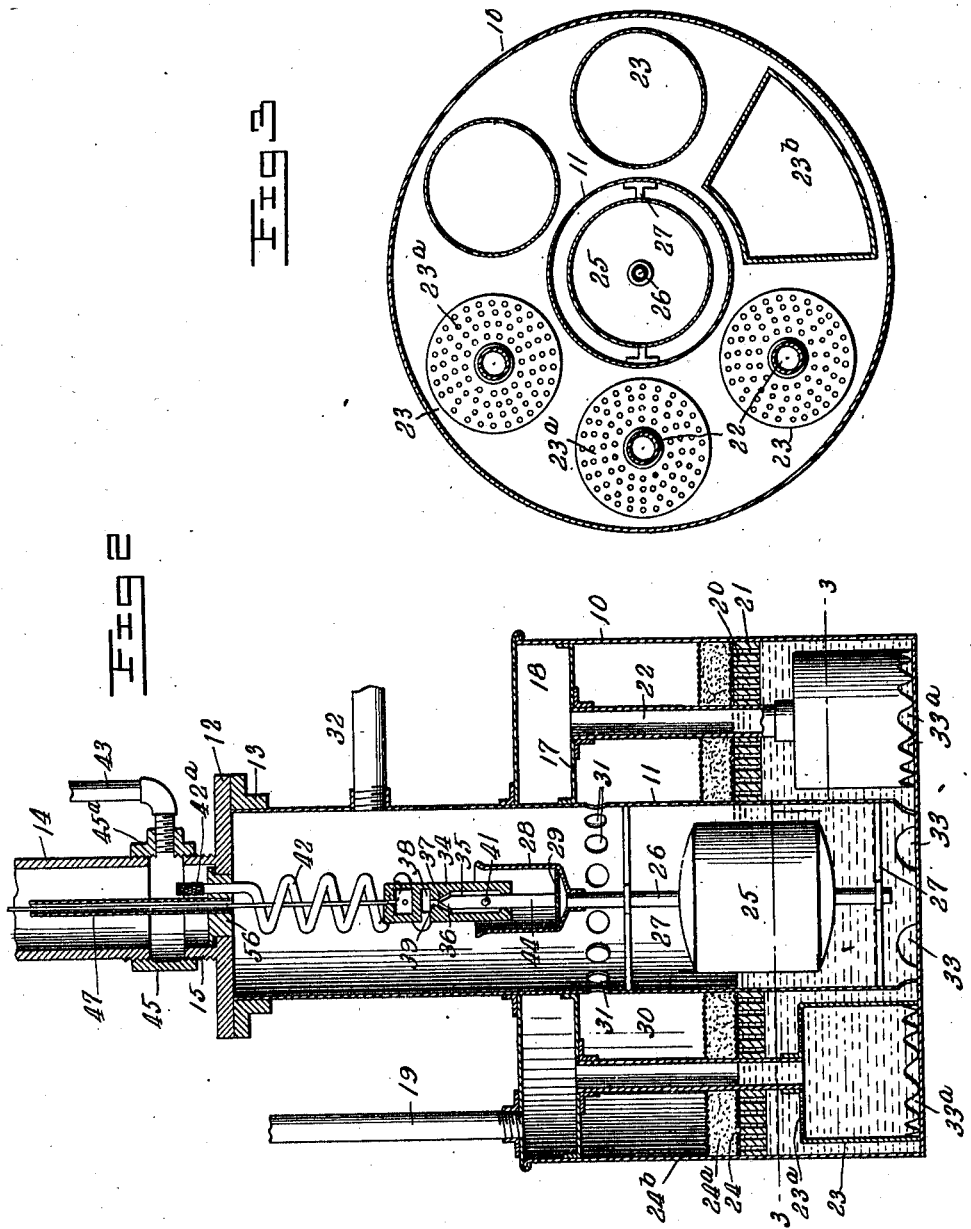
Inventor
Clarence M. Kemp
Witnesses
By Meyers, Cushman & Rea
Attorneys

UNITED STATES PATENT OFFICE.

CLARENCE MAY KEMP, OF BALTIMORE, MARYLAND, ASSIGNOR TO THE C. M. KEMP MANUFACTURING CO., OF BALTIMORE, MARYLAND, A CORPORATION OF MARYLAND.

CARBURETER.

989,980.

Specification of Letters Patent.    Patented Apr. 18, 1911.

Application filed June 8, 1910. Serial No. 565,754.

*To all whom it may concern:*

Be it known that I, CLARENCE M. KEMP, a citizen of the United States, residing at Baltimore, in the State of Maryland, have invented new and useful Improvements in Carbureters, of which the following is a specification.

This invention relates to an apparatus for carbureting air; more especially to that class of machines for manufacturing gas to illuminate and heat individual buildings, or a few buildings with one plant, such as houses, factories and the like.

The main object of this invention is to so combine and arrange the several parts thereof that a constant level of the carbureting fluid within the container may be attained whether that level be high or low with respect to the container; that the air to be carbureted shall enter the fluid in finely divided particles, and as it emerges therefrom be further divided into minute or atomic particles (in the mechanical sense), thoroughly intermixed with the gaseous particles of the carbureting fluid to form a rich and so-called fixed gas which has great heat producing and illuminating properties.

With these and other objects in view, the invention consists of the construction, combination and arrangement of parts hereinafter described and claimed and illustrated in the accompanying drawings, in which:—

Figure 1 is a side view of a gas generating plant with the improved carbureter forming the subject matter of this invention, Fig. 2, a vertical sectional view of the carbureter enlarged, Fig. 3, a horizontal sectional view of the line 3—3 of Fig. 2, Fig. 4, a vertical sectional view of a part of the carbureter, and Fig. 5, a detailed sectional view in elevation of the inlet valve.

In the drawings, the numeral 10 indicates a tank within which air is carbureted and from the bottom of which a preferably cylindrical chamber 11 extends vertically through and above the tank for a suitable distance. A cap plate 12 covers the upper end of the chamber and is attached thereto in any desired manner, as by a flanged ring 13. The tank is usually buried in the ground at any required depth and is connected with the surface of the ground by a casing 14 attached to a threaded flange on the upper surface of the cap plate 12. At the surface of the ground the casing 14 is provided with a closure 16 of any suitable kind, a screw cap being shown as an example.

Within the tank 10, a short distance below the top thereof and surrounding the chamber 11, is an air tight diaphragm 17 forming with the top of the tank, an air receptacle 18, fed by an air pipe 19 from any source of pressure. Beneath the diaphragm 17 and about midway between the same and the bottom of the tank is a relatively thick composite horizontal partition 20 through one section 20ª of which are formed a large number of small vertical openings 21. Superposing this section is a reticulated plate 24 on which is disposed a layer 24ª of finely divided inert matter such as sand, a second reticulated sheet 24ᵇ may be placed over the inert material to retain it in place. Attached fluid tight to the under side of the diaphragm 17 and extending downwardly through the partition 20 are a number of tubes 22, their lower ends being formed integrally with or attached to large cylindrical receptacles 23 open at their lower ends and closed at their upper ends with perforated plates 23ª by means of which compressed air from the pipe 19 is broken up into small globules as it passes through said plate. The receptacles 23 may be cylindrical or made to conform in shape to the space they occupy as at 23ᵇ Fig. 3. Openings 33 are formed in the lower end of the chamber 11, and 33ª in the lower ends of the receptacles 23 to permit gasolene or other hydrocarbon to enter the tank 10 and said receptacles from the chamber 11.

The normal level of the hydrocarbon fluid in the tank 10 is slightly above the gauze sheet 24 and is retained at this height by means of a float 25 in the chamber 11 mounted on a tubular stem 26 passing through said float and vertically movable in bearings 27. The upper end of the tubular stem 26 carries a cup 28 open at the top and provided with a strainer 29 at the bottom to prevent foreign matters passing into the tubular stem.

A valve casing 34 is supported over the cup 28 and projects normally a short distance within the same. Within the valve casing is a chamber 35, its upper end forming a seat 37 for a valve 36 slidable by gravity within said chamber and prevented from slipping out by a cross pin 41 projecting from the valve stem 44 and into a slot 40 in the valve casing which valve stem rests on the bottom of the cup 28 or the screen therein. A duct 39 connects the valve chamber 35 at the valve seat with a small reservoir 38 slightly above said valve seat. The reservoir 38 is kept filled with hydrocarbon fluid by a coil of small pipe 42, one end of which enters the small reservoir and its other end terminates within the gasolene holder 14 and its connections, and is covered by a reticulated metal or wire gauze cap 42$^a$.

Screwed on the threaded flange 15 projecting upwardly from the cover plate 12 is a T coupling 45, the opposite branch of which receives the lower end of the casing 14, while into the third and smaller branch 45$^a$ is screwed a pipe 43 for feeding the hydrocarbon fluid into the casing 14 from a holding tank 55 preferably buried in the ground, as is also the carbureter.

A vertical tube 47 extends through the casing 14 and is fastened at its lower end to a plug 56 fitted in an opening in the cover plate 12 from which projects a side flange resting on said plate to hold the plug in position and through which the upper end of the pipe coil 42 passes. The upper end of the tube 47 extends to the top of the casing 14 and is closed except for a threaded opening to receive a vertical screw or bolt 57 attached at its lower end to a rod 48 extending downward to the valve casing 34 and fastened to the upper end thereof. If desired, the rod 48 and the screw 57 may be made integral. Now, if the screw 57 be turned in one direction, it will lower the valve casing and through the medium of the valve rod depress the float and raise the fluid level in the tank 10. A reverse turning of the screw raises the valve casing and the float will rise and lower the fluid level.

A straight coupling 58 is screwed part way on the upper end of the casing 14, and into its upper end is screwed the flange of the cap 16. Between the cap flange and the top of the casing 14 is a disk 59 threaded in the coupling 58 and provided with an opening 60 through which the screw 57 easily passes, and chamfered or countersunk on the underside of the disk to bear on the upper end of the tube 47 shaped to fit the chamfer or countersink. When the disk is turned in the proper direction, it presses the plug 56, through the tube 47, firmly in its seat in the cover plate to prevent the escape of hydrocarbon through said seat, or the leakage outwardly of gas in the chamber 11.

A hydrocarbon fluid, such as gasolene, is poured into the holding tank 55 through a filling tube 61, whence it passes into the casing 14 through a pipe 62. Air from a fan or blower 63 is driven through the pipe 19 and delivered into the upper section 18 of the tank 10 and down the tubes 22 into the reservoirs 23 from which it escapes in small globules through the reticulated top, and thence through the gasolene in the tank 10 to the section 20$^a$, through the holes 21 therein and into the loose finely divided material 24$^a$. The globules of air passing through the perforated section 20$^a$, loose finely divided material 24$^a$ and the reticulated sheets 24 and 24$^b$ break up the globules into minute particles and, because of the attenuated condition of the gasolene, permit the gasolene and air to act upon each other, and form a gas by saturating the air with the vapors or volatile parts of the gasolene. The movement of the air is caused by the pressure behind it and its natural tendency to rise in a liquid substance and the gasolene rises because of the action of the air upon it and its natural tendency to rise to its level when fresh gasolene is fed to the bottom of the tank through the tubular stem 26. The level of the gasolene gradually falls during the manufacture of gas and the float 25 descends, thus causing the valve 36 to open. Gasolene in the casing 14 descends through the pipe coil 42 into the small reservoir 38 in the valve casing, through the duct 39 and past the valve to the cup 28. From the cup, the gasolene flows through the tubular stem to the bottom of the tank 10. As the tank gradually fills, the float rises and closes the valve when the fluid level is reached. When the gas is formed it passes into the central section 30 of the tank 10, thence through the openings 31 in the chamber 11 and emerges therefrom through the supply pipe 32 to the various points of distribution in a building.

What I claim is:

1. In a carbureting apparatus, a tank adapted to contain a predetermined quantity of hydrocarbon fluid, a float operated inlet valve for maintaining the level of said fluid in the tank, a fixed partition in said tank partly below the fluid level formed of a plurality of foraminous sections and a layer of inert granular material, a number of tubes extending through said partition through which tubes air is forced into said hydrocarbon fluid, and enlargements on the lower ends of said tubes open at their bottoms and having a plurality of small perforations through their tops.

2. In a carbureting apparatus, a tank adapted to contain a predetermined quantity of a hydrocarbon fluid, means for conveying said fluid directly to the bottom of said tank, a float operated inlet valve for maintaining the level of said fluid in the tank, a fixed composite partition in said tank partly below the fluid level comprising a foraminous section and a layer of finely divided granular material supported thereon, and air tubes extending below said partition and there provided with a plurality of small perforations.

3. In a carbureting apparatus, a tank adapted to contain a predetermined quantity of a hydrocarbon fluid, a float operated inlet valve for maintaining the level of said fluid in the tank, a fixed composite partition in said tank partly below the fluid level comprising a foraminous section of substantially non-pervious material, a layer of fine granular material supported thereon, and a sheet of reticulated material between them, an air chamber, and a plurality of air tubes leading from said chamber below said partition into the hydrocarbon fluid and there provided with a plurality of small perforations.

4. In a carbureter, a closed tank for containing a hydrocarbon fluid, a pervious horizontal partition therein partly below the level of said fluid, and tubes through which air is forced into the hydrocarbon fluid, said partition comprising a finely perforated relatively thick section, a reticulated plate or wire gauze sheet on said section, and a layer of finely divided loose granular material the thickness of which may be varied.

5. In a carbureter, a closed tank for containing a hydrocarbon fluid, a pervious horizontal partition and support therein below the level of said fluid, and tubes through which air is forced into the hydrocarbon fluid, said partition supporting a finely perforated relatively thick section, a reticulated plate or wire gauze sheet, and a layer of finely divided loose material as sand the thickness of which may be varied.

6. In a carbureter, a closed tank for containing a hydrocarbon fluid, an air chamber near the top of said tank, a compressed air tube opening into said chamber, a foraminous partition above the bottom of said tank comprising a finely perforated section and a layer of sand kept saturated with hydrocarbon fluid through capillary attraction, air tubes extending from said air chamber through the foraminous partition, and reservoirs on the end of said tubes extending toward or nearly to the bottom of said tank, the tops of said reservoirs being perforated and the bottom open to the tank.

In testimony whereof I have hereunto set my hand in presence of two subscribing witnesses.

CLARENCE MAY KEMP.

Witnesses:
EDGAR J. KEMP,
JOHN S. COLE.

---

Copies of this patent may be obtained for five cents each, by addressing the "Commissioner of Patents, Washington, D. C."